United States Patent [19]

Ikoma et al.

[11] Patent Number: 5,051,899
[45] Date of Patent: Sep. 24, 1991

[54] DATA TRANSMISSION ERROR DETECTION IN AN ELECTRONIC CASH REGISTER SYSTEM

[75] Inventors: Keiichi Ikoma; Shuuzi Katayama; Shizuo Nakai; Kenji Miwa, all of Nara, Japan

[73] Assignee: Sharp Kabushiki Kaisha, Osaka, Japan

[21] Appl. No.: 474,218

[22] Filed: Feb. 2, 1990

Related U.S. Application Data

[63] Continuation of Ser. No. 312,329, Feb. 16, 1989, abandoned, which is a continuation of Ser. No. 932,946, Nov. 20, 1986, abandoned.

[30] Foreign Application Priority Data

Nov. 22, 1985 [JP] Japan ................... 60-263124

[51] Int. Cl.$^5$ .................... G07G 1/12; H04L 1/14
[52] U.S. Cl. .................... 364/405; 371/34; 371/71
[58] Field of Search ............ 364/405; 371/24, 34, 371/67.1, 71

[56] References Cited

U.S. PATENT DOCUMENTS

| 2,871,289 | 1/1959 | Cox et al. ................ 371/71 |
| 3,008,129 | 11/1961 | Katz ........................ 37/71 |
| 3,868,633 | 2/1975 | Nuese ...................... 364/200 |
| 3,995,258 | 11/1976 | Barlow ..................... 364/200 |
| 4,034,195 | 7/1977 | Bates ....................... 371/71 X |
| 4,254,409 | 3/1981 | Busby ...................... 340/731 |
| 4,257,031 | 3/1981 | Kirner et al. .............. 371/24 |
| 4,266,293 | 5/1981 | Anderson et al. ........... 371/24 |
| 4,271,513 | 6/1981 | Maejima et al. ............ 371/24 X |
| 4,380,068 | 4/1983 | de Couashon ............... 371/24 |
| 4,541,066 | 2/1985 | Lewandowski ............... 371/24 |

FOREIGN PATENT DOCUMENTS

| 0150038 | 7/1985 | European Pat. Off. . |
| 0175343 | 3/1986 | European Pat. Off. . |
| 0186746 | 7/1986 | European Pat. Off. . |
| 190393 | 12/1904 | Fed. Rep. of Germany . |
| 698489 | 11/1940 | Fed. Rep. of Germany . |
| 0083430 | 5/1984 | Japan ..................... 371/71 |
| 948519 | 2/1969 | United Kingdom . |
| 1143746 | 2/1969 | United Kingdom . |
| 1164531 | 9/1969 | United Kingdom . |
| 1437393 | 5/1976 | United Kingdom . |
| 1532753 | 11/1978 | United Kingdom . |

OTHER PUBLICATIONS

"Write Data Wrap Test," Danen et al., IBM T.D.B., vol. 26, No. 10A, 3/84, p. 4879.

Primary Examiner—Jerry Smith
Assistant Examiner—Steven G. Kibby
Attorney, Agent, or Firm—Birch, Stewart, Kolasch & Birch

[57] ABSTRACT

A data error-checking system including a transmitting cash register and a receiving cash register, connected to each other in series in a loop formation. Its operation includes the serial transfer of data from the transmitting cash register to the receiving cash register simultaneous with data transfer from the receiving cash register to the transmitting cash register, and comparison of the data transferred from the transmitting cash register with the corresponding data transferred back from the receiving cash register to the transmitting cash register.

3 Claims, 3 Drawing Sheets

DATA TRANSMISSION ERROR DETECTION IN AN ELECTRONIC CASH REGISTER SYSTEM

This application is a continuation of application Ser. No. 07/312,329 filed on Feb. 16, 1989, now abandoned, which is a continuation of Ser. No. 932,946 filed Nov. 20, 1986, now abandoned.

BACKGROUND OF THE INVENTION

The present invention relates to a system that checks whether or not any errors are present in data signals that have been transferred serially from one electronic cash register to another cash register.

Conventionally, when data signals are transferred from one electronic cash register (hereinafter referred to as "ECR") to another ECR, the data-transmitting register of the transmitting ECR serially transfers data signals to the data-receiving register of the receiving ECR. These conventional transmitters must check whether or not the data has been received correctly. This error check is executed in accordance with the procedure described below. After the initial data transfer, the receiving ECR sends back the received data to the data-receiving register of the initial transmitting ECR. The data-transmitting register of the initial transmitting ECR then compares this data with the originally transmitted data. Thus, the error-checking system employed by any such conventional ECR system must transfer the data twice, first in one direction and then back in the other direction. This error checking system inevitably doubles the time required for simple data transfer without error checking.

SUMMARY OF THE INVENTION

The primary object of the present invention is to provide a novel system that checks for the presence of errors in serially transferred data signals without sacrificing transfer speed.

Another object of the present invention is to provide a novel network of several cash registers, capable of correctly checking for any errors in data signals transferred from one ECR to another, without lowering the transfer speed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following description.

To achieve these objects, a serial data transfer error-checking system related to the present invention is provided as described in the following specification.

The data-transmitting shift register of the transmitting ECR is connected serially to the data-receiving shift register of the receiving ECR in a loop formation. Simultaneous with the serial transfer of data signals from the transmitting ECR to the receiving ECR, the data signals are serially transferred back from the receiving ECR to the transmitting ECR. The system controller then compares the latter data signals with the former. The serial-data transfer error-checking system embodied by the present invention may also be applied to a complete network of ECRs.

In summary, as data signals from the transmitting ECR are delivered to the receiving register, the data signals stored in the receiving ECR are transferred back to the transmitting ECR, simultaneously. The system controller of the transmitting ECR then compares the data signals delivered to the receiving ECR with those which have been transferred back to the transmitting ECR from the receiving ECR to check whether or not there are any errors present. The error check can be performed without slowing the speed of data transfer to one-half the normal speed, a disadvantage which is otherwise unavoidable in conventional systems.

BRIEF DESCRIPTION OF THE DRAWINGS

The present invention will be better understood from the detailed description given hereinbelow and the accompanying drawings which are given by way of illustration only, and, thus are not limitative of the present invention in which.

DESCRIPTION OF THE PREFERRED EMBODIMENTS

Figure 1:
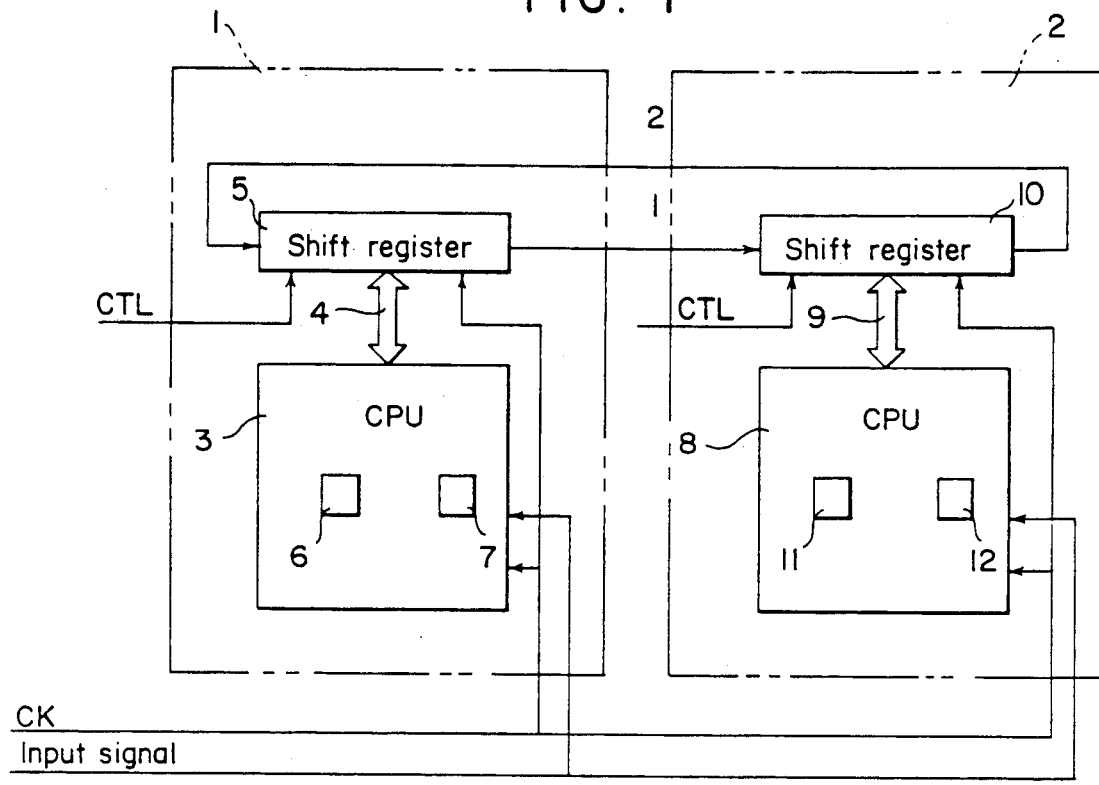
FIG. 1 is a simplified block diagram depicting one of the preferred embodiments of the error-checking system comprised of several ECRs, related to the present invention.

FIG. 1 is a simplified block diagram of one of the preferred embodiments of the data transfer error-checking system related to the present invention. This system comprises several identical ECRs.

One of the preferred embodiments uses a system comprising a transmitting ECR 1 and a receiving ECR 2, each of which receives an identical synchronized clock signal (CK) to allow for simultaneous operation. The transmitting ECR 1 is provided with a central processing unit (CPU) 3 which is substantially composed of a microcomputer. For example, a transmitting shift register 5, having an 8-bit capacity, is connected to the CPU 3 via an 8-bit parallel data bus 4, so that 8-bit data signals can be transferred between the transmitting shift register 5 and the CPU 3 in parallel. The CPU 3 is provided with a memory 6 having a memory capacity sufficient to store at least the memory contents of the transmitting shift register 5 and a counter 7 as well. One 8-bit data signal transferred between the CPU 3 and the transmitting shift register 5 are hereinafter referred to as one "character" in the following description. The receiving ECR 2 is provided with the same components as that of the transmitting ECR 1 described above. It includes a CPU 8, a receiving shift register 10 connected to the CPU 8 via a data bus 9, and a memory 11 and a counter 12 present in the CPU 8. The transmitting shift register 5 and the receiving shift register 10 are connected to each other in a loop formation via serial data lines 11 and 12.

Figure 3B:
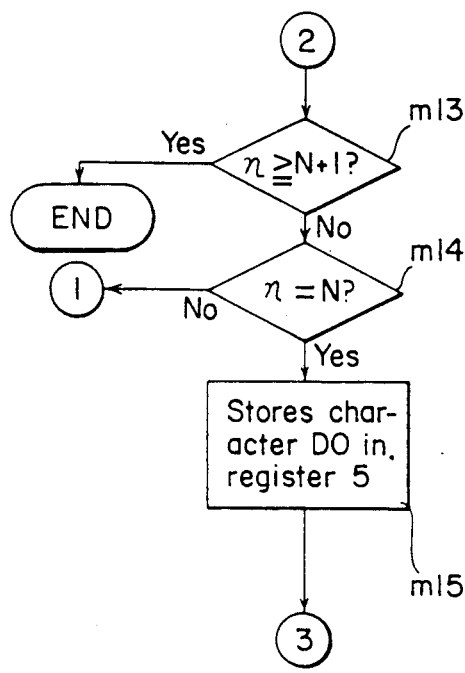
FIG. 3 is a flowchart describing the procedure of data transfer operations related to one of the preferred embodiments of the present invention.
Figure 2:
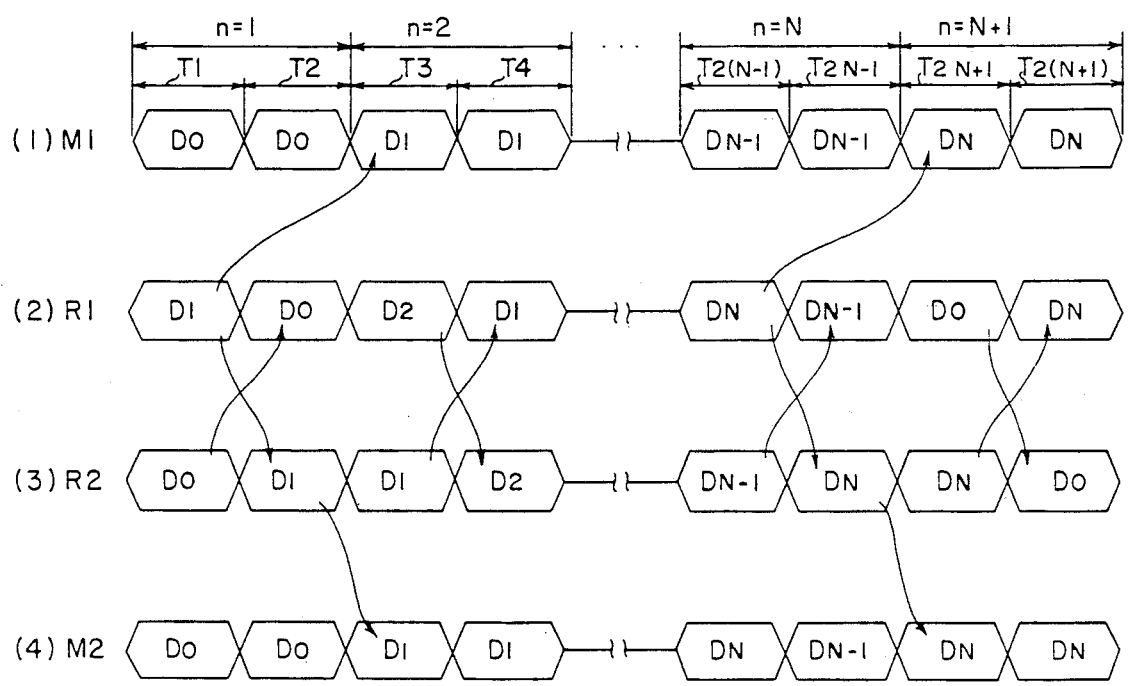
FIG. 2 is a timing chart depicting the data transfer operations of the data transfer error-checking system shown in FIG. 1.
Figure 3A:
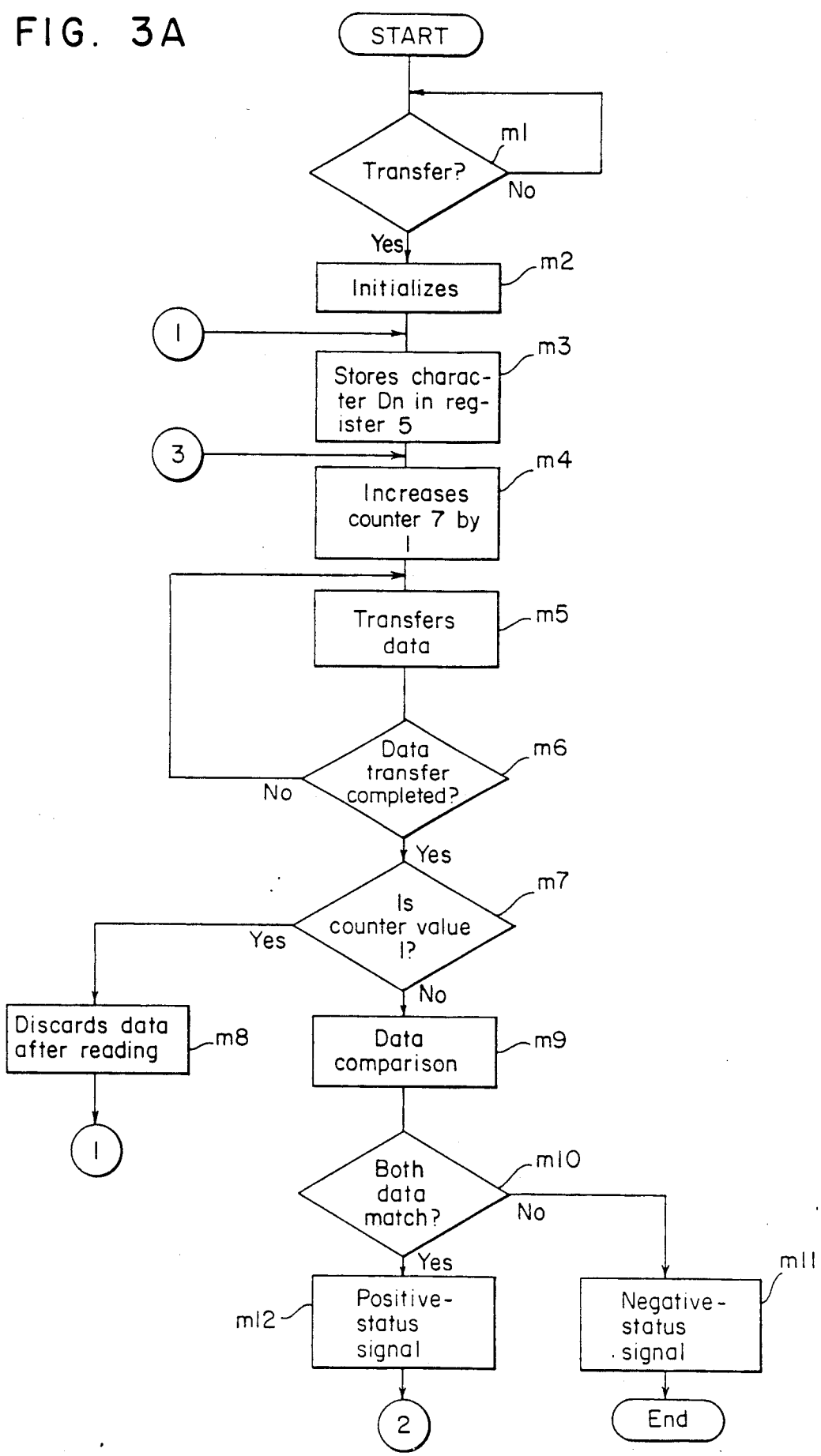

FIG. 2 is a timing chart depicting data signal transfer operations under the arrangement shown in FIG. 1. FIG. 3 is a flowchart describing the procedure of data signal transfer. Referring now more particularly to FIGS. 1 through 3, data transfer operations under the arrangement shown in FIG. 1 are described below. When the operation enters step m1 as shown in FIG. 3 the controller which is included in the CPU 3 system first determines whether or not the data transfer operation should be started. The incoming signal, shown in FIG. 1, instructs the system to begin the data transfer operation. Standby condition lasts until the data transfer activation signals are delivered to the transmitting and receiving ECRs 1 and 2.

As soon as both ECRs receive the data transfer activation signals, the operation proceeds to step m2 to fully initialize and clear the contents of the shift registers 5 and 10, the memories 6 and 11, and the counters 7 and 12. Note that FIG. 2 (1) shows the data contents of the memory 6; FIG. 2 (2), the data contents of the transmitting shift register 5; FIG. 2 (3), the data contents of the receiving shift register 10; and FIG. 2 (4), the data contents of the memory 11. After the contents of the shift registers 5 and 10, the memories 6 and 11, and the counters 7 and 12 are fully cleared, the values of the counters 7 and 12 are denoted as "n". For example, in this preferred embodiment, the CPU 3 checks errors in the data, presented as characters D1, D2, ---, Dn, --- DN. N is the maximum character number to be processed.

Thus value "n", counted by the counters 7 and 12, and the annexed character "n" of the character code D, already processed when the counters 7 and 12 indicate the character value "n", match correctly. Character D0 shown in FIG. 2 is substantially an 8-bit data signal controlling the operations needed to transfer the first and the Nth characters D1 and DN from the receiving shift register 10 to the transmitting shift register 5, while executing the first and the Nth data processing operations to be described later. When step m3 is entered, character Dn (e.g., n=1 while the present process is underway), generated in conjunction with the data delivered to the CPU 3, is stored in the transmitting shift register 5. The receiving shift register 10 and the memory 11 remain in the initialized condition, in which a controlling character D0 is stored. These steps are denoted by the period T1 shown in FIG. 2. When step m4 is entered, the value of the counter 7 increases by 1. By knowing the value "n" of the counter 7, the presence of character Dn, the latest character delivered from the CPU 3 to the transmitting shift register 5, can be acknowledged.

In step m5, those characters stored in the transmitting shift register 5 are transferred to the receiving shift register 10, as the character transfer operation is executed in series. Character D0, stored in the receiving shift register 10, is then transferred to the transmitting shift register 5 via line 12, and again stored in the transmitting shift register 5. The Memory 11 stores character D1. These steps are denoted by the period T2 shown in FIG. 2. The serial data transfer error-checking system reflecting the present invention also may provide another way of transferring characters in series between these shift registers 5 and 10 by transferring a 1-bit character data signal with each synchronizing clock signal CK. When step m6 is entered, the system controller first identifies whether or not the transfer of characters D1 and D0 is finished. If it is not yet finished, the operation mode returns to step m5 to resume the designated transfer operations. Conversely, if it is identified that the character transfer operation is finished, the control system checks the value "n" of the counter 7. A value of "1" (one) indicates that the controlling character D0 is stored in the transmitting shift register 5. Since this character controls data transfer operations, no error check is necessary, and thus, when step m8 is entered, no error check is executed for the controlling character D0 and this data is discarded. Next, the operation mode returns to step m3, where the transmitting shift register 5 is cleared before storing character D2. Simultaneously, the memory 6 of the CPU 3 stores character D1, having the preceding annexed number. While step m3 is underway, the receiving shift register 10 and the memory 11 store character D1. These steps are denoted by the period T3 shown in FIG. 2. When step m4 is entered, the value of the counter 7 increases by 1 so that the counter value becomes n=2. When the operation mode proceeds to step m5, the data signal is transferred from the transmitting shift register 5 to the receiving shift register 10 through the designated operations described earlier. If it is identified during step m6 that the data transfer operation is finished, the control system then checks to see whether or not the counter 7 has a value of 1. Simultaneously, the character D2 stored in the transmitting shift register 5 is transferred to the receiving shift register 10, and the character D1 stored in the receiving shift register 10 is again stored in the transmitting shift register 5 via line 12. Simultaneously, the memory 11 of the CPU 8 stores character D2, transferred to the receiving shift register 10. Meanwhile, the memory 6 of the CPU 3 stores the preceding character D1. These steps are denoted by the period T4 shown in FIG. 2. When step m7 is entered, the control system checks the value of the counter 7. However, this time the value is identified to be n=2 as mentioned above, and thus the operation proceeds to step m9, in which the system controller compares the contents of the transmitting shift register 5 with the contents of the memory 6 of the CPU 3. The comparison process may also be executed by first converting characters stored in the shift register 5 and the memory 6 into data signals, based on either decimal or hexadecimal notation, and then checking whether or not these values are equal to each other. Next, in step m10, the control system identifies whether or not the characters checked during step m9 match correctly. If these values are identified not to match, an error obviously was generated while characters were being exchanged between the shift registers 5 and 10 via line 1 or 2. Finally, during step m11, the CPU 3 outputs negative status signals to the CPU 8 and external sources to complete the entire operation.

If it is identified during step m10 that the characters are identical, the CPU 3 outputs the positive status signal to the CPU 8 and external sources. The CPU 8 then identifies that character D1, stored in the memory 11, has been delivered correctly to the receiving shift register 10 before reading it. The operation then proceeds to step m13, in which the system controller checks whether or not the value "n", the number of data signal transfers from the transmitting shift register 5 shown in FIG. 1 to the receiving shift register 10, is N+1. If "n" is more than N+1 the entire operation will be completed. If the number of the data transfer value "n" is less than N+1, the operation mode proceeds to step m14, in which the control system identifies whether or not "n" is equal to N. At this point, the data transfer value is set to 2 (two) to cause the operation to return to step m3 for repeated execution of the sequential steps described above.

Next, as shown by the period T2 (n−1) in FIG. 2, when the transmitting shift register 5 stores character DN, character DN-1 already has been stored in the memories 6 and 11 and the receiving shift register 10. In step m4 the value "n" of the counter 7 increases by 1 so that it becomes n=N. Next, in step m5, the data transfer operation is executed, this process being denoted by the period T (2N−1). When step m7 is entered, the system controller checks the value of the counter 7. While step m7 is underway, "n" is equal to N, and the control system then compares data values during step m9. The system controller then continues with the steps thus far described. Since the value of the counter 7 is n=N during step m14, operation proceeds to step m15 to allow the controlling character D0 to be stored in the transmitting shift register 5. While step m15 is underway, character DN is stored in the memories 6 and 11 and the receiving shift register 10. These steps are denoted by the period T (2N+1) in FIG. 2. The operation next returns to step m4, in which the value of the counter 7 increases by 1 so that the value "n" becomes N+1. controlling character D0, stored in the transmitting shift register 5, is transferred to the receiving shift register 10, and conversely, character DN, stored in the receiving shift register 10, is transferred to the transmitting shift register 5 via line 12. Since the value of the counter 7 is n=N+1 during step m7, the system controller then compares the data signals during step m9. These steps are denoted by the period T2 (N+1) in FIG. 2. When step m13 is entered, since the value "n" is equal to N+1, the entire operation is finished.

As is clear from the foregoing description, the ECR system embodied by the present invention is capable of simultaneously transferring data from the transmitting shift register 5 to the receiving shift register 10, and from the receiving shift register 10 to the transmitting shift register 5 by using a novel arrangement in which the transmitting shift register 5 and the receiving shift register 10 are connected to each other in a loop formation, allowing the built-in CPUs to simultaneously check for any errors that may be present in the data transferred back to the transmitting shift register 5. Consequently, the ECR system having the arrangement shown in FIG. 1 can check for any errors in the transferred data signals without sacrificing transfer speed. According to the preferred embodiments of the ECR related to the present invention, it is possible for the system to serially transfer the data signal from the transmitting shift register of the transmitting ECR to the receiving shift register of the receiving ECR, and at the same time serially send back the data signal received by and stored in the receiving shift register to the transmitting shift register. The CPU of the transmitting shift register compares the last data signal sent to the receiving shift register with the data signal sent from the receiving shift register. As a result, it allows this ECR system to transfer the data signal while simultaneously checking for any errors that may have occurred during the previous data signal transfer. Accordingly, this ECR system can check for errors without lowering the speed of serial data transfer. In a network comprised of more than three ECRs, each ECR is provided with the constitution shown in FIG. 1. The present invention also provides another preferred embodiment which does not require one ECR to be the transmitting ECR and the other to be the receiving ECR. Instead, both ECRs may be provided with shift registers capable of both transmitting and receiving functions, so that the ECRs can simultaneously transmit and receive data signals.

While only certain embodiments of the present invention have been described, it will be apparent to those skilled in the art that various changes and modifications may be made therein without departing from the spirit and scope of the present invention as claimed.

What is claimed is:

1. Data error-checking apparatus for a digital transfer system, comprising:

a first and a second data utilization unit, each utilization unit including a multi-bit shift register and a central processing unit coupled to said shift register via a bi-directional multi-bit parallel data bus, each of said central processing units further including a multi-bit memory having a capacity at least equal to that of said shift register whereby multi-bits of data defining a character are transferred in parallel between said memory and said shift register;

a first serial data line coupled from an output of the shift register of the first utilization unit to an input of the shift register of the second utilization unit; and a second serial data line coupled from an output of the shift register of the second utilization unit to an input of the shift register of the second utilization unit, and wherein in a data error checking cycle, the bits of a first multi-bit data character are initially serially transferred from the shift register of said first utilization unit to the shift register of said second utilization unit, the bits of said first data character are also initially transferred to said memory of the central processing unit of said first utilization unit, and thereafter when a second multi-bit data character is serially transferred from the shift register of said first utilization unit to the shift register of said second utilization unit, said shift register simultaneously serially transfers said first data character back to the shift register of said first utilization unit, the starting time of the transfer of the first data character back to the first utilization unit being the same as that of the transfer of the second data character from said first utilization unit to the second utilization unit, wherein the central processing unit of said first utilization unit then compares said first data character stored in the memory of the central processing unit of said first utilization unit with said first data character transferred back to the shift register of said first utilization unit from the shift register of said second utilization unit, and wherein said central processing unit of the first utilization unit further determines whether or not the bits of the compared characters match and said central processing unit thereafter generates a first type output status signal when the compared characters are identical and generates a second type status signal when the compared characters are not identical.

2. The apparatus as defined by claim 1 where said first and second data utilization unit comprises a cash register.

3. A data error checking method for a data communication system including at least one central processing unit, a transmitting register at a transmitting end of said system and a receiving register connected in series in a loop formation to said transmitting register at a receiving end of said system, comprising the steps of:

initializing both said transmitting and receiving registers simultaneously to activate the synchronous transfer of data therebetween;

serially transferring the bits of a first multi-bit data character from said transmitting register to said receiving register for being latched therein;

storing the bits of said first data character in a multi-bit memory in said central processing unit;

serially transferring a second multi-bit data character from said transmitting register to said receiving register;

serially transferring said first data character from said receiving register back to said transmitting register, in response to and simultaneous with the transfer of said second character;

comparing said first data character stored in said memory with said first data character transferred back to said transmitting register from said receiving register and determining whether or not the bits of said characters match; and generating and outputting a first type status signal from the central processing unit when said determining step determines that said characters are identical while generating and outputting a second type status signal from the central processing unit when the determining step determines that said characters are not identical.

* * * * *